United States Patent [15] 3,683,384
Warren [45] Aug. 8, 1972

[54] RADIO DIRECTION FINDER

[72] Inventor: Maurcie A. Warren, Los Angeles, Calif.

[73] Assignee: Vec/Trak Research & Development Corporation, New York, N.Y.

[22] Filed: July 22, 1969

[21] Appl. No.: 843,500

[52] U.S. Cl. ..............343/113 PT, 325/361, 325/464
[51] Int. Cl. ..............G01s 3/14
[58] Field of Search .343/113, 115, 113 PT; 325/355, 325/361, 464–465, 458, 462, 111, 352, 16, 312

[56] References Cited

UNITED STATES PATENTS

| | | | |
|---|---|---|---|
| 2,439,412 | 4/1948 | Mitchell | 325/465 X |
| 2,519,415 | 8/1950 | Thomas | 325/355 |

FOREIGN PATENTS OR APPLICATIONS

| | | | |
|---|---|---|---|
| 1,024,640 | 3/1966 | Great Britain | 343/113 |

OTHER PUBLICATIONS

ABC' s of Radionauigation by Allan Lytel, Howard W. Sams & Co., Inc. 1962 pp. 75, 76 relied on.
" Motorola," Brochure Showing SCR511 Cavalry Guidon Set; April 2, 1945.

*Primary Examiner*—Benjamin A. Borchelt
*Assistant Examiner*—Richard E. Berger
*Attorney*—Hubbell, Cohen & Stiefel

[57] ABSTRACT

A radio direction finder encased in a gun-like housing and having an opening in the housing through which a replaceable fixed single frequency tuner module may be inserted in to the circuit, the tuner module being precisely tuned to the radio frequency of a radio beacon to be detected. Interposed between the output of the audio amplifier of the radio direction finder and the speaker therefor is an audio frequency filter tuned to pass the audio frequency tone of radio beacons but to filter out all other audio frequencies, whereby to reduce the amount of noise presented to the listener.

9 Claims, 2 Drawing Figures

INVENTOR
MAURICE A. WARREN
BY
Hubbell, Cohen & Stiefel
ATTORNEYS.

RADIO DIRECTION FINDER

BACKGROUND OF THE INVENTION

1. Field of the Invention

The present invention relates to radio direction on finders.

2. Description of the Prior Art

Radio direction finders are well known. Generally speaking they are provided with a directional antenna which feeds a radio receiver having an audio output. The antenna is pivoted to bring it into radial alignment with a source of radio frequency, whereby to null out the audio signal broadcast by the radio source. By obtaining the bearing with respect to two spaced apart radio transmitters, the position of a ship or aircraft can be ascertained.

Generally speaking radio direction finders utilize variable capacitance tuning for the purpose of selecting a particular radio source for obtaining a bearing. Such a tuner provides a continuous frequency selection. As the spectrum may be crowded with radio sources, the navigator may believe he is taking a bearing on one RF source when in fact he is taking a bearing on another. This can lead to a serious navigational error which could, under the wrong conditions, actually prove fatal.

Further, since most radio direction finders rely on a nulling of an audio signal to obtain a bearing, it is important that at the signal null there be no output through the loudspeaker.

SUMMARY

A radio direction finder is provided with a socket base for insertion of the pin connector of a tuner module precisely tuned to a particular radio beacon frequency identified with a particular radio transmitter on which the navigator wishes to take a bearing. Thus, by having a plurality of sharply tuned removable tuner modules, the navigator can select the appropriate module, connect it into the tube socket, and thereupon take a bearing with precision and without fear of error from mistuning. Additionally, the radio direction finder is provided with an audio frequency filter to filter out audio signals other than the known audio frequency of radio beacons, namely 1,020 hertz.

Preferably the radio direction finder is encased in a pistol shaped casing wherein the tube socket is disposed near the front of the barrel of the casing to make it readily available for connection with a tuner module. The antenna is disposed within the casing in alignment with the longitudinal axis thereof. Fixed to the barrel of the casing is a compass whereby to enable direct reading of the bearing of the transmitter with respect to the finder without recourse to a separate instrument.

DETAILED DESCRIPTION OF THE PREFERRED EMBODIMENTS

Figures 1, 2:
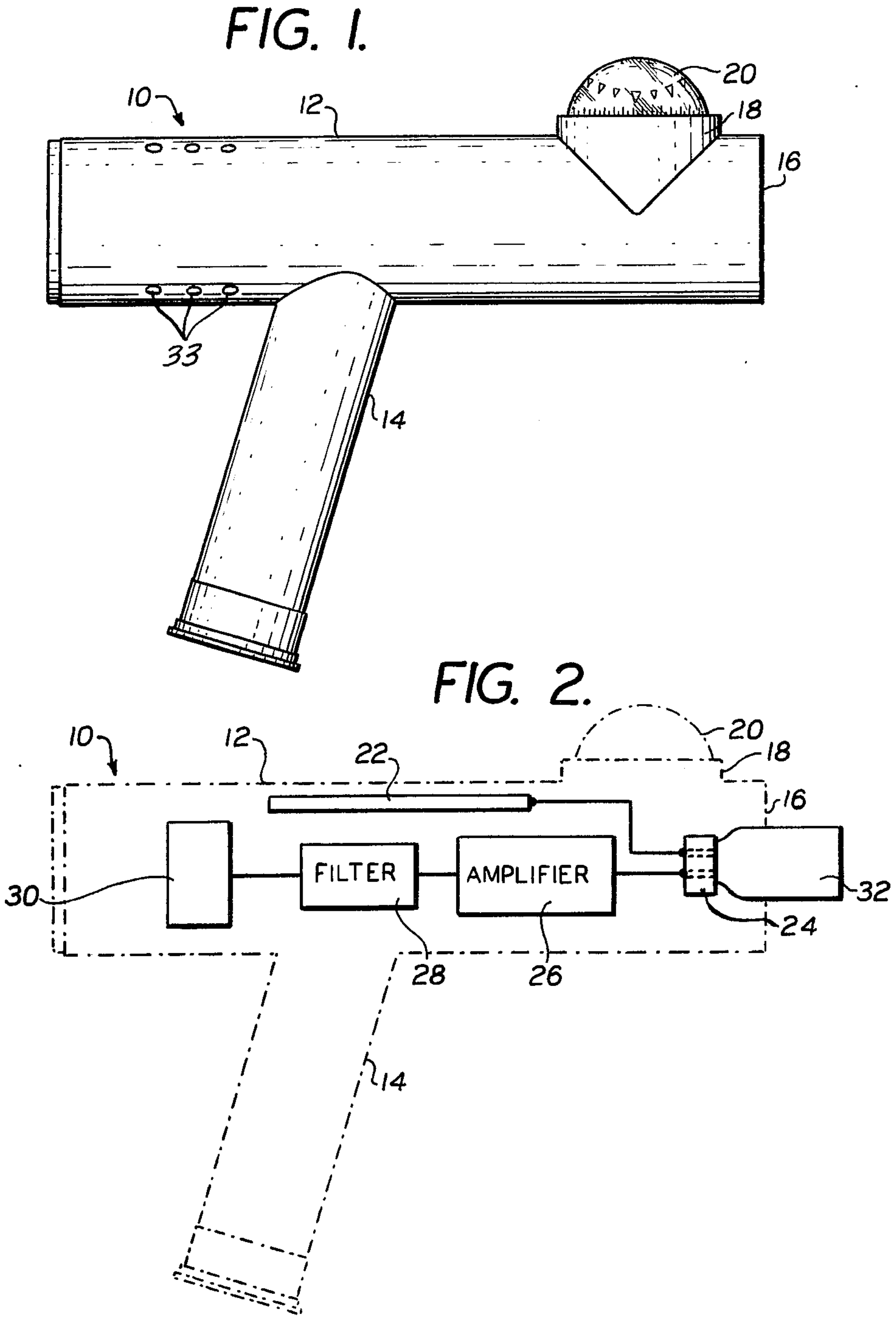
FIG. 1 is a side elevational view of a radio direction finder embodying the present invention.
FIG. 2 is a diagrammatic view of some of the mechanical and electrical details of the radio direction finder.

Referring now to the drawing in detail, the radio direction finder is generally designated by the reference numeral 10. The radio direction finder is housed in a housing that is preferably pistol shaped, being made up of a hollow cylindrical barrel 12 with a depending handle 14. Near the front 16 of the barrel 12 is an upstanding boss 18 which supports a magnetic compass 20.

Disposed within the barrel 12 is a directional antenna 22 which is connected to a suitable connector 24 here shown in the form of a socket for reception of a pin base. Antenna 22 is preferably electrically aligned with the longitudinal axis of barrel 12. The socket 24 is arranged to receive the complementary base, such as a pin base, of a pretuned fixed single frequency tuner module 32 which may be plugged into the base 24 through the open front end 16 of the barrel 12. The socket 24 is arranged to be connected through necessary and well-known circuitry (not shown) to an audio amplifier 26, the output of which is connected to a filter 28 that is in turn connected to a speaker 30 which is in register with apertures 33 in the barrel 12. It will be obvious to anyone skilled in the art that the radio direction finder 10 will also include certain RF stages (and perhaps IF stages) which will be interposed between the antenna 22 and the speaker 30; these have already been referred to as "well-known circuitry." These stages are not specifically illustrated in the drawing as they are well-known to the skilled art worker. Suffice it to say they could be incorporated either in the pretuned tuner module 32 or in the block of the diagram labeled amplifier and designated by the reference character 26 or in a separate block in between the two. Also, there is no illustration of a power supply for the radio direction finder 10. The provision of such a power supply is well within the ability of the skilled art worker and for that reason is not expressly illustrated. However, it should be pointed out that the handle 14 which is a hollow tube would make an especially desirable housing for one or more batteries to provide the energy to power the entire radio direction finder.

As is well-known to the navigator, in any particular region, there may be a number of radio beacons each operating on a separate known frequency. Generally the frequency is not duplicated within a particular region within the United States although it may be duplicated in other regions not contiguous with the region in question. Thus a plurality of fixed single frequency tuner modules 32 can be constructed, each tuned to a particular radio frequency used by radio beacons for navigational purposes, and each of the modules 32 can be marked with indicia bearing the names of the particular radio beacons to which the particular module is used. The navigator operating in a particular region will equip himself with a group of modules 32, one for each beacon in his region.

When the navigator wants to obtain his bearing with respect to a particular radio beacon, he will select the module 32 bearing the name of the radio beacon on which the bearing is to be taken, which module is precisely tuned to the radio frequency of the beacon. Thus, the possibility of error through mistuning is substantially eliminated. The module 32 is thereupon inserted through the open end 16 into the interior of barrel 12 to be plugged into the socket 24 whereby to complete the entire radio direction finder circuit to cause it to operate on the preselected frequency. Upon completion of the radio direction finder electronic system, an audio tone will be put out by the speaker 30 which tone will be tuned to precisely 1,020 hertz, the audio frequency of all U.S. radio beacons. The navigator will thereupon swing his radio direction finder 10 through a horizontal arc until the antenna 22 is aligned with respect to the radio beacon to yield a minimum input at which point the tonal output from the speaker 30 will stop. At this null point the navigator will read the compass 20 and get a magnetic bearing of the radio beacon relative to his ship or plane. By well-known methods a true bearing can be calculated.

Thereafter, the navigator will remove the module 32 from the socket 24 and select a second module 32 that is tuned to a second radio beacon on which the navigator wishes to take a bearing. After the second module 32 is plugged into the socket 24, the navigator will repeat the above described procedure and get a second bearing. By drawing on a chart the bearings of the ship or plane with respect to the two beacons, the navigator can obtain a "fix" or position for his vessel or aircraft.

As previously noted, all US radio beacons produce an audio signal of 1,020 hertz. To reduce the noise of the radio direction finder 10 in order to obtain a clear null when the antenna 22 is properly aligned with the beacon on which a bearing is being taken, an audio filter 28 is interposed between the output terminals of the audio amplifier 26 and the input terminals of the speaker 30 which filter 28 is tuned to pass signals of 1,020 hertz and to block all other audio frequency signals. Thus, most of the noise can be eliminated by filter 28 whereby to provide a clear null during the navigating procedure as above described.

Thus, by having a plurality of plug-in fixed single frequency modules 32 aboard the vessel, an navigator, by selecting appropriate modules, can be precisely tuned to particular radio beacons in the area of operation and obtain an accurate fix of his position with substantially no chance of error.

What is claimed is:

1. A radio direction finder comprising a directional antenna, a removable tuner module fixedly tuned to a preselected radio frequency, and quick connect-disconnect means for removably connecting radio tuner module into said radio direction finder, whereby said tuner module can be disconnected and replaced by another like module tuned to a different radio frequency, and circuit means for connecting said directional antenna to said tuner module.

2. The radio direction finder of claim 1, wherein said quick connect-disconnect means comprises complementary interfitting members, one fixed on said tuner module and the other fixed on said directional antenna and the balance of said radio direction finder.

3. The radio direction finder of claim 2, further comprising a housing for said directional antenna and said balance of said radio direction finder, said housing having an opening therein, said other member of said quick connect-disconnect means being rendered accessible to said first mentioned complementary member of said quick connect-disconnect means through said opening.

4. The radio direction finder of claim 3, said tuner module being encased in an enclosure including said first mentioned complementary interfitting member.

5. The radio direction finder of claim 4, wherein said housing is formed of an elongated hollow barrel with a handle depending therefrom, and said opening is at the front end of said barrel.

6. The radio direction finder of claim 5, further comprising a compass on said barrel.

7. A method of taking a bearing on a radio beacon using a radio direction finder including a directional antenna, a removable tuner module fixedly tuned to a preselected radio frequency, and quick connect-disconnect means for removably connecting said tuner module into said radio direction finder, selecting from from a group of like tuner modules fixedly tuned to different frequencies the module tuned to the frequency of said radio bearing, removing the tuner module connected to said radio direction finder, connecting said selected tuner module to said radio direction finder, and moving said directional antenna to produce a tonal null.

8. The radio direction finder of claim 5, wherein said directional antenna is disposed within said hollow barrel.

9. The radio direction finder of claim 6, wherein said directional antenna is disposed within said hollow barrel.

* * * * *